United States Patent [19]

Platts

[11] Patent Number: 5,342,690

[45] Date of Patent: Aug. 30, 1994

[54] RETICULAR GLASS SURFACE

[75] Inventor: Dennis R. Platts, Livonia, Mich.

[73] Assignee: Ford Motor Company, Dearborn, Mich.

[21] Appl. No.: 979,036

[22] Filed: Nov. 20, 1992

[51] Int. Cl.$^5$ ............................................ B32B 17/00
[52] U.S. Cl. .................... 428/410; 428/336; 428/337; 428/409; 428/426; 428/432; 428/441; 428/697; 428/699; 428/701
[58] Field of Search ............................ 65/30.13, 30.14; 428/409, 410, 426, 336, 337, 432, 441, 697, 699, 701, 141, 142; 427/527, 529

[56] References Cited

U.S. PATENT DOCUMENTS

| | | | |
|---|---|---|---|
| 3,944,697 | 3/1976 | Ichimura | 428/410 |
| 4,083,727 | 4/1978 | Andrus | 428/410 |
| 4,849,247 | 7/1989 | Scanlon | 427/223 |
| 4,952,446 | 8/1990 | Lee | 428/410 |
| 5,102,736 | 4/1992 | Townsend | 65/30.13 |

*Primary Examiner*—Ellis P. Robinson
*Assistant Examiner*—Timothy M. Speer
*Attorney, Agent, or Firm*—Lorraine S. Melotik; Roger L. May

[57] ABSTRACT

A reticular surface is formed on a glass article by implanting element ions into the surface of the glass and thereafter heating the glass article.

7 Claims, No Drawings

RETICULAR GLASS SURFACE

FIELD OF THE INVENTION

This invention relates generally to reticular glass surfaces, and more particularly, to a method for preparing a reticular glass surface utilizing ion implantation.

BACKGROUND OF THE INVENTION

It is known to use ceramic and organic paints to coat at least a portion of the surface of a glass sheet, to form an opague border around the peripheral marginal surface thereof, for the preparation of automotive windshields, sidelites, and backlites. Such a concealment band is generally applied to the inner surface of the glass sheet (the surface of the glass sheet nearest the vehicle occupants). A major difficulty encountered during the preparation of such coated glass sheets, however, is a lack of adhesion between the coating and the glass sheet. Thus, paint applied to the glass sheet tends to flake or peel off over time.

It is known from the prior art to apply an adhesion promoter to the glass surface prior to the application of the coating material. Such adhesion promoters include organic silanes such as γ-aminopropyltriethoxysilane.

Alternatively, it is known to roughen the surface of the glass, to increase the surface area of the glass exposed to a coating material, and thereby increase the mechanical bonding between the coating and the glass sheet. For example, the surface of the glass sheet may be abraded by a grinding operation or may be treated with an etchant such as hydrofluoric acid.

U.S. Pat. No. 4,849,247 to Scanlon et al. discloses applying high energy ions to the surface of an article sufficient to allow improved adhesion between the article and the surface of a substrate. For example, ions of the substrate material may be implanted into the surface of the article, to prepare a layer of the substrate material on the surface of the article. Thereafter, the article may be adhered to the substrate by conventional techniques such as, for example, brazing or welding. The patent does not, however, disclose the use of high energy ion bombardment to prepare a reticular surface on the substrate, to increase the adhesion of an article thereto by simple mechanical bonding.

It would be desirable to prepare a reticular surface on a glass article by a simple process, so that paint and other coatings applied thereto would adhere more tenaciously.

SUMMARY OF THE INVENTION

Accordant with the present invention, a process for preparing a reticular glass surface surprisingly has been discovered. The process comprises the steps of:

A) injecting element ions into a surface region of a glass article by ion implantation; and B) heating the glass article to a temperature and for a time sufficient to cause the surface of the glass to become reticular.

The inventive process is particularly well suited for manufacturing automotive and architectural glazings having painted peripheral marginal concealment bands thereon.

DETAILED DESCRIPTION OF THE PREFERRED EMBODIMENT

The present invention is directed to a process for preparing a reticular glass surface. By the term "reticular glass surface" is meant that the surface of a glass article is roughened so that another material adhered thereto bonds more tenaciously than it would otherwise adhere to a smooth glass surface. The process generally comprises a two-step procedure. First, element ions are injected into the surface region of the glass article, utilizing ion implantation. Thereafter, the glass article is heated to a temperature and for a time sufficient to cause the ion implanted surface thereof to become reticular.

Ion implantation is a well-known process for injecting ions of elements into the surface region of a glass article. Ions of the selected elements are electrically accelerated toward the target glass article, and attain an energy sufficient to cause the element ions to significantly penetrate the glass article. The atoms of the selected elements are ionized by collisions with electrons in an electrical discharge in a gas at low pressure, and then accelerated by a negative electrical potential to the penetration velocity. When the ions of the selected elements collide with the surface of the glass article, they actually tunnel into or are implanted into the surface region of the glass. Thus, a buried element phase is formed in the surface region of the target glass article.

Various element ions may be used for the ion implantation process of the present invention including, but not necessarily limited to, yttrium, zirconium, niobium, etc., as well as mixtures of element ions. Particularly useful element ions comprise yttrium ions. Ion implantation energies may vary over a wide range from about 10 KeV to about 2 MeV, to produce a useful ion concentration from about $10^{12}$ to $10^{18}$ ions/cm$^2$. Preferably, the ion implantation energy ranges from about 50 KeV to about 100 KeV. The element ions generally penetrate the glass to a depth of up to about 10,000 Angstroms, thereby defining the surface region of the glass article.

TABLE I

| Ion Penetration (Angstroms) Versus Implantation Energy | | | |
|---|---|---|---|
| Ion Energy | Yttrium | Zirconium | Niobiumm |
| 10 KeV | 105 | 104 | 104 |
| 80 KeV | 450 | 442 | 37 |
| 330 KeV | 1,593 | 1,560 | 1,526 |
| 2 KeV | 10,200 | 9,998 | 9,764 |

The ion implanted glass article thereafter is heated to a temperature and for a time sufficient to cause the ion implanted surface to become reticular. The mechanism by which ion implanted glass becomes reticular upon heating according to the present invention is not presently understood. That a reticular glass surface is produced is totally unexpected since it is well known that heating a glass article tends to "fire polish" any surface scratches or irregularities.

The temperature to which the ion implanted glass article is heated may vary over wide limits from about 400° C. to about 700° C. The time during which the ion implanted glass article is maintained at the elevated temperature is not sharply critical and may vary from a few minutes to a few hours. Heating may be accomplished by any conventionally known method such as, for example, by passing the glass article through a gas fired or electrical resistance heating furnace. Depending upon the nature of the glass composition and/or the implanted ions and their concentration, the surface region of the glass article may alternatively be heatable by electromagnetic radiation such as, for example, by infrared or microwave energy.

Thus, a reticular glass surface is produced which appears hazy, due to the surface irregularities, yet substantially transparent. The reticular glass surface may then be coated with a ceramic or organic paint, or other decorative coating material, which adheres tenaciously to the surface of the glass article due to the increased mechanical bonding. Typically, organic paints bond to a glass surface upon drying or crosslinking. Ceramic paints are bonded to a reticular glass surface by heating the glass article to vitrify the ceramic paint and fuse it to the reticular glass surface.

EXAMPLES

The surfaces of glass sheets manufactured by the float glass process are implanted with element ions at an energy of about 80 KeV to a concentration of about $5 \times 10^{16}$ ions/cm$^2$. The ion implanted glass sheets are thereafter heated to the temperatures and for the periods of time set forth in Table I. The ion implanted surfaces become reticular; hazy, yet substantially transparent.

TABLE II

| | Element Ion | Heat Treatment | Surface Configuration |
| --- | --- | --- | --- |
| Example 1 | yttrium | 640° C./90 min. | reticular |
| Example 2 | zirconium | 640° C./90 min. | reticular |
| Example 3 | niobium | 660° C./15 min. | reticular |
| Comparison 1 | iron | 640° C./90 min. | smooth |
| Comparison 2 | zinc | 640° C./90 min. | smooth |

From the foregoing description, one ordinarily skilled in the art can easily ascertain the essential characteristics of this invention, and without departing from the spirit and scope thereof, can make various changes and modifications in the invention to adapt it to various usages and conditions.

What is claimed is:

1. A glass article, having ion implanted element ions selected from the group consisting of yttrium, zirconium, niobium and mixtures thereof in a surface region thereof and a reticular surface, said element ions having a concentration from about $10^{12}$ ions/cm$^2$ to about $10^{18}$ ions/cm$^2$.

2. The glass article according to claim 1, wherein the element ions comprise yttrium.

3. The glass article according to claim 1, wherein the surface region has a thickness of up to about 10,000 Angstroms.

4. A coated glass article, wherein the coating is adhered to a reticular glass surface having ion implanted element ions selected from the group consisting of yttrium, zirconium, niobium and mixtures thereof in a surface region thereof said element ions having a concentration from about $10^{12}$ ions/cm$^2$ to about $10^{18}$ ions/cm$^2$.

5. The coated glass article according to claim 4, wherein the coating is a ceramic or organic paint.

6. The coated glass article according to claim 4, wherein the element ions comprise yttrium.

7. The coated glass article according to claim 4 wherein the surface region has a thickness of up to about 10,000 Angstroms.

* * * * *